United States Patent [19]

Moeller et al.

[11] 4,013,390

[45] Mar. 22, 1977

[54] VULCANIZING MOLD FOR PNEUMATIC VEHICLE TIRES

[75] Inventors: Heinz J. Moeller, Apelern; Heinz Jagau, Berenbostel, both of Germany

[73] Assignee: Continental Gummi-Werke Aktiengesellschaft, Hannover, Germany

[22] Filed: Jan. 19, 1976

[21] Appl. No.: 650,075

[30] Foreign Application Priority Data

Jan. 21, 1975 Germany .......................... 2502185

[52] U.S. Cl. ................................ 425/47; 425/46
[51] Int. Cl.² .......................................... B29H 5/08
[58] Field of Search .............. 425/20, 29, 43, 46, 425/47

[56] References Cited

UNITED STATES PATENTS

| | | | |
|---|---|---|---|
| 3,461,502 | 8/1969 | Turk et al. ........................ | 425/29 |
| 3,464,090 | 9/1969 | Cantarutti ........................ | 425/46 X |
| 3,778,203 | 12/1973 | MacMillan ........................ | 425/20 |
| 3,852,006 | 12/1974 | Irie ........................ | 425/47 |
| 3,922,122 | 11/1975 | Bottosso et al. ........................ | 425/46 |

FOREIGN PATENTS OR APPLICATIONS

| | | | |
|---|---|---|---|
| 1,440,604 | 4/1966 | France ........................ | 425/43 |
| 1,160,606 | 1/1964 | Germany ........................ | 425/47 |

*Primary Examiner*—J. Howard Flint, Jr.
*Attorney, Agent, or Firm*—Walter Becker

[57] ABSTRACT

A vulcanizing mold for pneumatic vehicle tires with upper and lower mold segments distributed over the circumference of the mold, for molding the tread surface of the respective tire to be molded, while the mold segments cooperate with rings for selectively moving the segments toward the tire tread surface to be molded. The mold furthermore comprises rings which mold the tire side walls and are provided with seating surfaces for receiving and guiding the tire beads. The rings for moving the segments toward the circumferential tire surface consist of two rigid pressure rings which are movably guided in axial direction of the tire to be molded and by means of pressure exerted from the outside of the mold upon the pressure rings are movable toward each other for moving the segment sections together and toward the circumferential area of the tire.

6 Claims, 2 Drawing Figures

VULCANIZING MOLD FOR PNEUMATIC VEHICLE TIRES

The present invention relates to a vulcanizing mold for pneumatic vehicle tires which includes a plurality of segments distributed over the circumference of the mold and respectively divided at half their height. These segments mold the tire tread surface while the sections of the segments are connected with rings which mold the tire side walls, the portions being movable relative to the tire tread surface. The ring sections molding the tire side walls are provided with seating surfaces which receive the tire beads and guide the same.

Devices are known for moving the segment portions which are movable in radial direction during the closing of the vulcanizing mold in precisely symmetrical arrangement toward each other against the tread strip of the raw tire in order to avoid the danger of uncontrolled changes in the position of the raw tire and the inherent molding errors. While such devices operate fairly well, with increasing requirements concerning the quality and the dynamic behavior of the tires, the problem arose further to narrow down the manufacturing tolerances and to assure greater uniformity when producing larger numbers of tires in mass production.

It is, therefore, an object of the present invention to provide a vulcanizing mold which will meet these requirements.

This object and other objects and advantages of the invention will appear more clearly from the following specification in connection with the accompanying drawings, in which.

Figure 1:
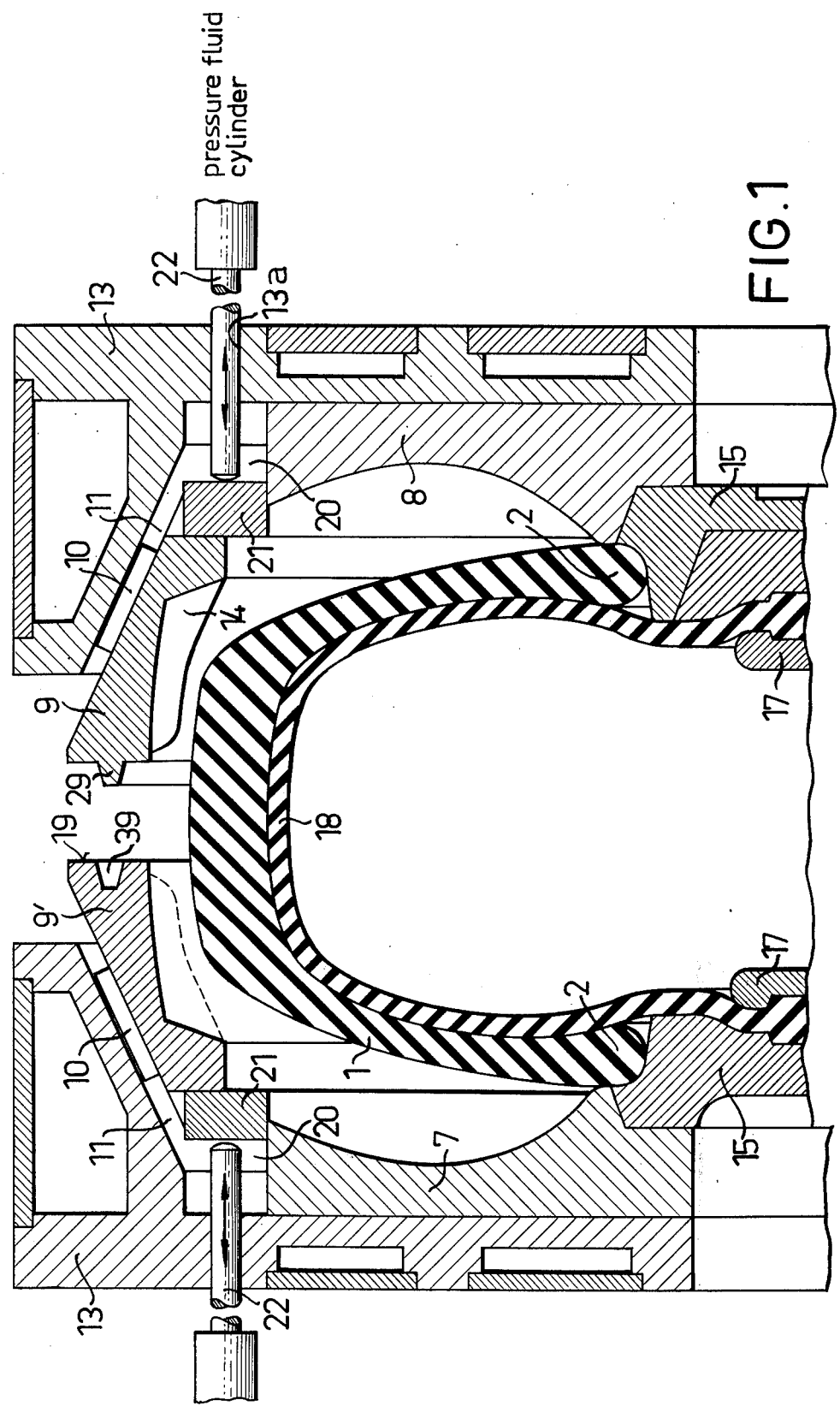
FIG. 1 is a radial fragmentary section through a vulcanizing mold according to the invention in opened condition.

The vulcanizing mold according to the present invention is characterized primarily by two rigid pressure rings which surround the rings molding the tire side walls and which are movable and guided in axial direction of the tire relative to the molding rings for the tire side walls. The rigid pressure rings are adapted under the influence of pressure forces exerted from the outside of the mold to be pressed against the segment sections so as to reduce the spacing between the pressure rings.

Expediently a plurality of pressure-actuated push rods is distributed over the circumference of the pressure ring sections. These push rods may be designed as plungers of pressure-medium-operated cylinders or may be operatively connected thereto for displacing the pressure rings relative to each other.

According to a further development of the invention those end faces of the segment sections which face away from the pressure rings may, when being pressed against each other, be provided with interengaging cross sectional projections, on the one hand, and with depressions, on the other hand, expediently in the form of closed continuous annular ribs or grooves. As a result thereof, the segment portions or sections will be positively centered whereby the uniformity of the movement, above all in the radial components, will be greatly increased and improved.

Referring now to the drawings in detail, the illustrated vulcanizing mold primarily comprises a lower ring 7, an upper ring 8 and a plurality of segments which are distributed over the circumference of the two molding rings. These segments are respectively divided at half their height into two sections 9, 9'. The molding rings 7 and 8 serve for molding the side walls of the raw tire 1, whereas the segment sections or portions 9, 9' mold the tire tread surface and to this end are provided with elevated profile elements 14. The back side of the segment portions 9, 9' which face away from the raw tire 1 are provided with jaws 10 or similar guiding elements by means of which they are in positive connection slidingly guided in inclined guiding means 11 onto holding rings 13 which surround and receive the molding rings 7, 8. The rings 7, 8 have their inner rims end in extensions 15 which in their turn form engaging and seating surfaces for the tire beads 2 and simultaneously form abutments for axially movable plates 17 for clamping therein a bellows body 18 inserted into the interior of the raw tire 1.

Pressure rings 21 are slidably movable in axial direction so placed in an annular recess 20 between the outer mantle of rings 7, 8 and the pertaining holding rings 13 that the pressure rings 21 can be displaced on the outer end face of the segment portions 9, 9'. The pressure rings 21 may, for instance, be of steel and may have an approximately rectangular cross section. The pressure rings 21 frictionally engage pressure-operated push rods 22 which are movable in the direction indicated by the double arrows and are inserted in bores 13a of the holding rings 13.

Figure 2:
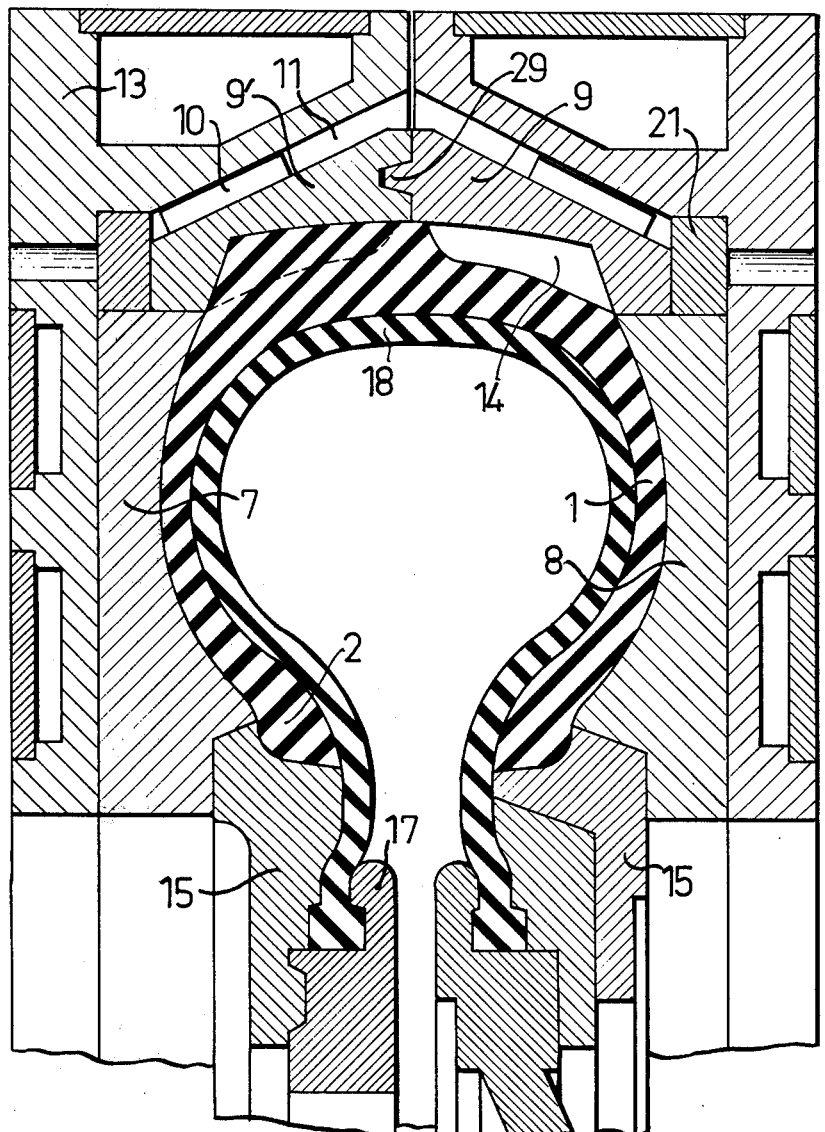
FIG. 2 shows a section similar to that of FIG. 1 but with the mold in closed condition.

The end faces 19 which face each other and pertain to the segment portions 9, 9' are provided with ribs 29 and grooves 39 which extend along circular arcs and have matching trapezoidal cross sections so that the segment portions 9, 9', when occupying their closing position shown in FIG. 2, are centered and are positively interlocked.

After inserting the raw tire 1 into the mold and after expanding the inflatable body 18 into the raw tire, the rings 7, 8 starting from the position shown in FIG. 1, are moved relative toward each other while the segment portions 9 which slide along the inclined guiding means 11 move radially in the direction toward the center of the tire. Due to the automatic control by the pressure rings 21 advanced by the pushrods 22, all segment portions of each one half are always at one and the same level so that the profile elements 14 in the further course of the closing movement will enter uniformly into the tread surface in all circumferential regions of the raw tire 1. Due to the immersion of the trapezoidal ribs 29 into the groove 39 during the final phase, a maximum of precision in the shape of the tire will be assured.

In completely closed condition of the vulcanizing mold, the pressure rings are under the direct influence of the force of the holding rings 13 and the pertaining vulcanizing press elements not shown. The push rods 22 may, therefore, be withdrawn as soon as the vulcanizing cycle starts so that, during the opening of the mold, they can act as ejector for lifting out the finish-vulcanized tire.

As will be evident from the above, by the introduction of special pressure rings a uniform coherent support is created for the segment portions 9 of both mold sections whereby over the heretofore customary individual actuation of the mold sections there is automatically assured an always uniform holding of all segment portions at the same level. The proper course of movement during the closing and opening of the vulcanizing mold is thus in all phases independent and not influenced by changing and not easily recognizable interfering conditions so that the manufacturing precision of the vulcanized tires can be maintained at the desired uniformity, and the heretofore unavoidable proportion of waste can be considerably lowered and practically eliminated.

It is, of course, to be understood that the present invention is, by no means, limited to the specific showing in the drawings but also comprises any modifications within the scope of the appended claims.

We claim

1. A vulcanizing mold for pneumatic vehicle tires, which includes in combination: a first mold ring, a second mold ring arranged opposite said first mold ring, said mold rings being operable to receive therebetween a raw tire to be molded and to mold the side walls thereof, said first and second mold rings being selectively movable relative toward and away from each other, a first and a second rigid pressure ring respectively slidably surrounding said first and second mold rings and being guidingly engaged thereby, a first set of segments associated with and engageable by first pressure ring and distributed over the circumference of said first mold ring, a second set of segments associated with and engageable by said second pressure ring and distributed over said second mold ring, power operable means respectively associated with said first and second mold rings and operable through the intervention of said pressure rings to move said sets of segments toward each other in the axial direction of said pressure rings, and combined holding and guiding ring means respectively surrounding said first and second sets of segments and movable toward each other for simultaneously guiding the respective pertaining segments in common in the axial direction of said pressure ring means and in a direction transverse to the axial direction of said pressure ring means for molding the tread surface of a raw tire to be molded in said mold.

2. A mold in combination according to claim 1, in which said power operable means include pressure operable push rods distributed over the circumference of said pressure rings and extending toward the outside of said mold while being operable to displace said pressure rings in the axial direction thereof.

3. A mold in combination according to claim 2, in which said push rods respectively form parts of fluid operable cylinder-piston means.

4. A mold in combination according to claim 1, in which said pressure rings are respectively guided by the outer peripheral surface of said first and second mold rings.

5. A mold in combination according to claim 1, in which those end faces of both sets of segments which are remote from the pertaining pressure rings face each other and are respectively provided with projections and recesses for engagement with each other and centering each other in closing position of said mold.

6. A mold in combination according to claim 5, in which said projections and recesses respectively form annular ribs and grooves.

* * * * *